United States Patent
Son et al.

(10) Patent No.: US 9,976,806 B2
(45) Date of Patent: May 22, 2018

(54) BURNING APPARATUS AND METHOD FOR MANUFACTURING REDUCED IRON USING THE SAME

(71) Applicant: POSCO, Pohang-Si, Gyeongsangbuk-Do (KR)

(72) Inventors: Sang Han Son, Pohang-Si (KR); Jong In Park, Pohang-Si (KR); Min Kyu Wang, Pohang-Si (KR); Byung Woon Hwang, Pohang-Si (KR)

(73) Assignee: POSCO (KR)

( * ) Notice: Subject to any disclaimer, the term of this patent is extended or adjusted under 35 U.S.C. 154(b) by 280 days.

(21) Appl. No.: 14/526,607

(22) Filed: Oct. 29, 2014

(65) Prior Publication Data
US 2015/0115508 A1    Apr. 30, 2015

(30) Foreign Application Priority Data

Oct. 30, 2013 (KR) .................. 10-2013-0130326
Nov. 27, 2013 (KR) .................. 10-2013-0145041

(51) Int. Cl.
*C21B 3/00*    (2006.01)
*F27D 13/00*    (2006.01)
(Continued)

(52) U.S. Cl.
CPC .......... *F27B 3/045* (2013.01); *C21B 13/0066* (2013.01); *C21B 13/0073* (2013.01);
(Continued)

(58) Field of Classification Search
CPC ............ C21B 13/0066; C21B 13/0073; C21B 13/105; C21B 13/14; C21B 2100/04;
(Continued)

(56) References Cited

U.S. PATENT DOCUMENTS 4,689,007 A * 8/1987 Kilian ................. F27B 21/06
266/178
2012/0119424 A1 * 5/2012 Bleifuss .............. C21B 13/0073
266/138

FOREIGN PATENT DOCUMENTS

BR         8502809      2/1986
CN     101575670 A    11/2009
(Continued)

*Primary Examiner* — Jessee Roe
*Assistant Examiner* — Michael Aboagye
(74) *Attorney, Agent, or Firm* — Finnegan, Henderson, Farabow, Garrett & Dunner, LLP

(57) ABSTRACT

A method for manufacturing reduced iron using the same, and more particularly, to a burning apparatus heating a coal briquette to manufacture reduced iron, which includes a first burning furnace heating the coal briquette while moving the truck accommodating the coal briquette along a linear movement path; a second burning furnace connected to the other side of the first burning furnace, and heating the coal briquette while moving the coal briquette discharged from the truck along an annular path; and a cooling device connected to the second burning furnace, and cooling the reduced iron while moving reduced iron reduced in the second burning furnace along an annular path. The burning apparatus circulates exhaust gases generated in the burning furnace and cooling device to control a temperature and an oxygen concentration and thus improves a metallization rate of the reduced iron.

10 Claims, 6 Drawing Sheets

(51) Int. Cl.
| | |
|---|---|
| *F27B 3/04* | (2006.01) |
| *F27D 17/00* | (2006.01) |
| *F27D 9/00* | (2006.01) |
| *F27D 7/04* | (2006.01) |
| *F27D 99/00* | (2010.01) |
| *C21B 13/00* | (2006.01) |
| *C21B 13/10* | (2006.01) |
| *C21B 13/14* | (2006.01) |
| *F27B 17/00* | (2006.01) |
| *F27D 3/12* | (2006.01) |

(52) U.S. Cl.
CPC ............ *C21B 13/105* (2013.01); *C21B 13/14* (2013.01); *F27D 7/04* (2013.01); *F27D 9/00* (2013.01); *F27D 13/00* (2013.01); *F27D 17/00* (2013.01); *F27D 99/007* (2013.01); *F27D 99/0033* (2013.01); *C21B 2100/04* (2013.01); *F27B 2017/0091* (2013.01); *F27D 2003/125* (2013.01); *Y02P 10/136* (2015.11)

(58) Field of Classification Search
CPC .. F27B 2017/0091; F27B 3/045; F27D 13/00; F27D 17/00; F27D 2003/125; F27D 7/04; F27D 99/0033; F27D 99/007; F27D 9/00; Y02P 10/136
USPC ......... 266/44, 171, 175, 176, 156, 178, 180, 266/183; 432/195, 176; 75/484, 503
See application file for complete search history.

(56) References Cited

FOREIGN PATENT DOCUMENTS

| | | |
|---|---|---|
| CN | 102643942 A | 8/2012 |
| JP | 6-16890 | 3/1994 |
| JP | 11-092833 A | 4/1999 |
| JP | 2005-139502 A | 6/2005 |
| KR | 10-2002-0003821 A | 1/2002 |
| KR | 10-2012-0129691 A | 11/2012 |
| KR | 10-2013-0053089 A | 5/2013 |
| KR | 10-2013-0116054 A | 10/2013 |
| WO | WO 2006/107332 A2 | 10/2006 |
| WO | WO 2013/026709 A1 | 2/2013 |

* cited by examiner

BURNING APPARATUS AND METHOD FOR MANUFACTURING REDUCED IRON USING THE SAME

CROSS-REFERENCE TO RELATED APPLICATION

This application claims priority to Korean Patent Application Nos. 10-2013-0130326 filed on Oct. 30, 2013, 10-2013-0145041 filed on Nov. 27, 2013 and all the benefits accruing therefrom under 35 U.S.C. § 119, the contents of which are incorporated by reference in their entirety.

BACKGROUND

The present invention relates to a burning apparatus and a method for manufacturing reduced iron using the same, and more particularly, to a burning apparatus and a method for manufacturing reduced iron using the same capable of improving a metallization rate of reduced iron though control over a temperature and an oxygen concentration inside a burning furnace.

A typical reduced iron manufacturing apparatus includes a plurality of hoppers accommodating an iron raw material and a carbonaceous material, respectively, a crusher receiving and crushing each of the iron raw material and the carbonaceous material, a mixer receiving and mixing the iron raw material and the carbonaceous material, a molding machine compressing and molding the resultant mixture obtained in the mixer, and a burning furnace heat-treating and burning a coal briquette molded in the molding machine.

Meanwhile, the coal briquette is heat-treated and reduced in the burning furnace to thus manufacture reduced iron. For this purpose, the burning furnace is commonly sealed, and a carbon monoxide (CO) gas, a carbon dioxide ($CO_2$) gas or a hydrogen (H) gas is supplied to the burning furnace in order to induce a reducing atmosphere inside the burning furnace.

However, it takes much time to create a reducing atmosphere inside the burning furnace, and thus there is a problem in which mass production of reduced iron is difficult.

Approximately 60% of an iron production amount throughout all over the world is manufactured through a blast furnace method which has been developed since the 14th century. The blast furnace method is a method in which both iron ore experiencing a sintering process and coke manufactured by using flaming coal as a raw material are introduced into a blast furnace, and high-temperature air is blown into the blast furnace to reduce the iron ore into iron, thus manufacturing ingot iron.

Since the blast furnace occupying the majority of an ingot iron manufacturing equipment requires a raw material having a predetermined level or more of strength and having a grain size for securing air permeability in the blast furnace due to its reaction characteristic, the blast furnace depends on coke manufactured by processing specific coking coal as a carbon source that is used as a raw material and a reductant as described above, and mainly depends on a sintered ore experiencing a series of agglomeration processes as an iron source.

In order to smoothen a flow of a reduction gas, a sintered ore formed by making a fine iron ore in a lump shape and coke formed by drying and distilling fine coal to make the fine coal in a lump shape are charged into a blast furnace.

Since the sintered ore having a lump shape has an extremely small contact area per unit volume with a raw gas compared to the fine iron ore, and the sintered ore has a small contact area with carbon even after reduction is completed in the blast furnace, it is difficult for carbon to permeate into reduced iron. Therefore, since the sintered ore has a high melting temperature, the sintered ore has fundamental problems in that a great amount of energy is consumed for melting the sintered ore and a production rate of molten iron is slow.

Therefore, developed was a process in which ultrafine iron ore is agglomerated into a briquette or a pellet, and a reducing atmosphere is induced in a rotary hearth furnace (RHF) to directly manufacture reduced iron. However, the process of directly manufacturing the reduced iron shows annual production of approximately 150,000 ton to 500,000, and thus has a limitation in mass production. Also this process has a reduction rate of 95% or more, and thus the reduced iron obtained by this process is used as a raw material for an electric furnace.

Also, developed was another process in which ultrafine iron ore is agglomerated into a briquette or a pellet and then burnt at a temperature of maximum 1,350° C. to partially manufacture reduced iron, and by which mass production is possible in an annual production of maximum 4,000,000 tons. However, since such a process is performed in an open type burning furnace that is not sealed, it is difficult to control a temperature and an oxygen concentration inside the burning furnace, and thus there is a problem in a metallization rate of partially reduced iron being relatively low.

PRIOR ART DOCUMENT

Patent Document

Patent document 1 KR 2013-53089A
Patent document 1 KR 2013-116054A

SUMMARY

The present disclosure provides a burning apparatus and a method for manufacturing reduced iron using the same, capable of controlling a temperature and an oxygen concentration in a burning furnace to improve a metallization rate of partially reduced iron.

The present disclosure also provides a burning apparatus and a method for manufacturing reduced iron using the same, capable of circulating, inside a burning furnace, an exhaust gas generated in a process manufacturing partially reduced iron to improve energy efficiency.

In accordance with an exemplary embodiment, a burning apparatus for manufacturing reduced iron by heating a coal briquette, the burning apparatus includes a burning furnace defining a path along which a truck accommodating the coal briquette is moved, wherein the burning furnace is partitioned into a plurality of regions, and some regions of the plurality of regions are communicated with each other.

The burning apparatus may include comprising an upper passage disposed in an upper portion of the burning furnace so as to be communicated with the burning furnace, and partitioned into a plurality of regions along a longitudinal direction of the burning furnace; an upper connection pipe connecting different regions of the upper passage; a lower passage disposed in a lower portion of the burning furnace so as to be communicated with the burning furnace, and partitioned into a plurality of regions along a longitudinal direction of the burning furnace; and a lower connection connecting pipe different regions of the lower passage, wherein the lower connection pipe and the upper connection pipe communicate at least one region of each of the lower and upper passages with the outside.

The burning furnace may be partitioned into a drying region, a pre-heating region, a reduction region, a first cooling region and a second cooling region with respect to a movement direction of the truck, and the lower connection pipe introduces air into the first cooling region and the second cooling region.

The lower connection pipe may be provided with a heat exchanger, wherein the heat exchanger is disposed on a lower connection pipe connecting the reduction region and the first cooling region.

The upper connection pipe may connect the second cooling region and the drying region, the first cooling region and the drying region, the first cooling region and the reduction region, and the pre-heating region and the reduction region, respectively, wherein a part of a gas generated in the second cooling region is discharged into the upper connection pipe connecting the second cooling region and the drying region.

The lower connection pipe may connect the second cooling region and the first cooling region, the reduction region and the first cooling region, the reduction region and the pre-heating region, respectively, wherein air is introduced into the lower connection pipe connecting the second cooling region and the first cooling region, and a gas generated in the drying region is discharged into the lower connection pipe connected to the drying region.

The burning furnace may include: a first burning furnace heating the coal briquette while moving the truck accommodating the coal briquette along a linear movement path; a second burning furnace connected to the other side of the first burning furnace, and heating the coal briquette while moving the coal briquette discharged from the truck along an annular moving path; and a cooling region connected to the second burning furnace, and cooling reduced iron while moving the reduced iron obtained in the second burning furnace along an annular moving path. the first burning furnace is partitioned into a drying region, a coal gasification region and a pre-heating region.

The first burning furnace may be partitioned into a drying region, a coal gasification region and a preheating region.

The cooling region may be partitioned into a first cooling region and a second cooling region.

The burning apparatus may include a connection pipe communicating at least two regions of the drying region, the coal gasification region, the pre-heating region, the first cooling region and the second cooling region, to each other.

The burning apparatus may include an introduction pipe supplying outside air to the first cooling region and the second cooling region.

The introduction pipe of the first cooling region may be connected to a connection pipe connecting the coal gasification region and the first cooling region.

The connection pipe may connect the coal gasification region and the first cooling region.

The connection pipe may connect the pre-heating region, the second cooling region and the coal gasification region.

The connection pipe may connect the pre-heating region and the drying region.

In accordance with another exemplary embodiment, a method for manufacturing reduced iron by moving a truck accommodating a coal briquette into a burning furnace, the method includes circulating at least a part of an exhaust gas generated in manufacturing the reduced iron inside the burning furnace to control a temperature and an oxygen concentration.

The burning furnace may be partitioned into a drying region, a pre-heating region, a reduction region, a first cooling region and a second cooling region along a movement direction of the truck; air may be introduced into the first cooling region and the second cooling region; and a gas generated in the pre-heating region, the reduction region, the first cooling region and the second cooling region may be circulated inside at least one region of the drying region, the pre-heating region and the reduction region to control a temperature and an oxygen concentration for each region inside the burning furnace.

A part of a gas generated by the air passing through the second cooling region may be discharged into the outside, and the remainder is supplied to the drying region.

A part of a gas generated in the reduction region may be supplied to the first cooling region.

Air and a part of a gas generated in the reduction region may be supplied to the first cooling region.

A part of a gas generated in the reduction region may be reduced in temperature and supplied to the first cooling region.

A part of a gas generated in the first cooling region may be supplied to the drying region, and the remainder may be supplied to the reduction region.

A part of a gas generated in the reduction region may be supplied to the pre-heating region.

The reduction region and the pre-heating region may have an oxygen concentration lower than that of the first cooling region.

The first cooling region may have an oxygen concentration lower than that of the second cooling region.

An exhaust gas, which is generated in a coal gasifying process of removing volatile matters of a carbonaceous material contained in the coal briquette during manufacture of the reduced iron, may be used as a cooling gas of the reduced iron.

The method may include a process of pre-heating the coal briquette after the coal gasifying process, wherein an exhaust gas generated in the process of pre-heating the coal briquette and an exhaust gas generated in a process of cooling the reduced iron are mixed to be supplied to the coal gasifying process so that the coal briquette is heated.

A drying process of removing moisture may be performed prior to of the coal gasifying process, wherein the drying process uses the exhaust gas generated in the process of pre-heating the coal as a heat source.

The process of cooling the reduced iron may include; a first cooling process of cooling the reduced iron to a temperature of 400° C. or more; and a second cooling process of cooling, to a temperature of 100° C. or more, the reduced iron cooled in the first cooling process, wherein the first cooling process uses the exhaust gas generated in the coal gasifying process as a cooling gas, and the second cooling process uses outside air as a cooling gas.

The second cooling process may use, as a cooling gas, a gas mixture of the outside air and the exhaust gas generated in the coal gasifying process.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Figure 1:
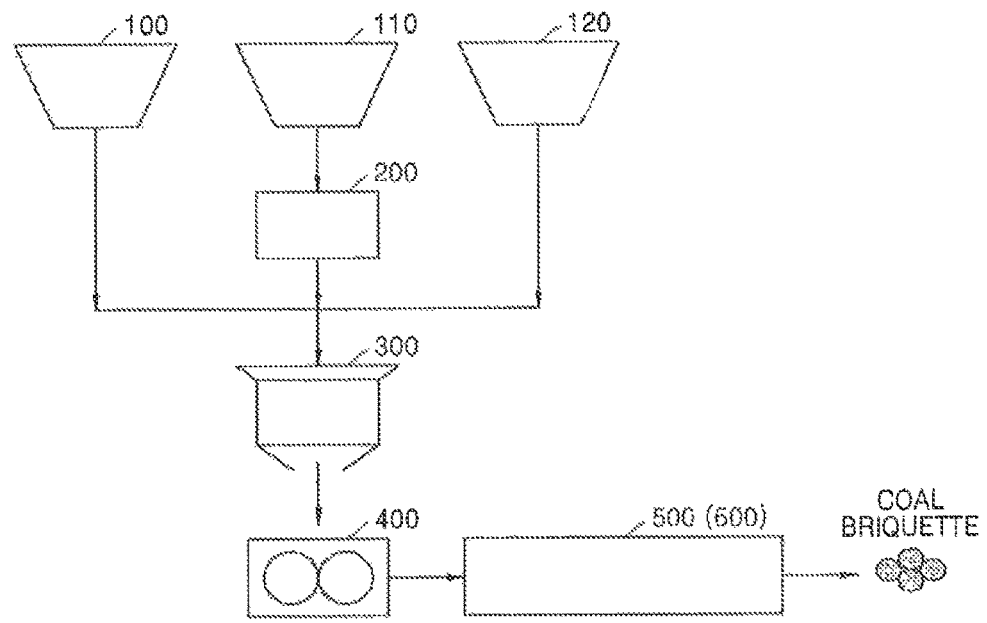
FIG. 1 is a block diagram showing a configuration of equipment for manufacturing reduced iron in accordance with an exemplary embodiment.

FIG. 1 is a block diagram showing a configuration of equipment for manufacturing reduced iron in accordance with an exemplary embodiment.

First, a reduced iron manufacturing method will be described as follows.

The reduced iron manufacturing method includes preparing and mixing an iron raw material and a carbonaceous material to be used as a reductant, molding a mixture formed by mixing the iron raw material and the carbonaceous material to manufacture a coal briquette, and then burning and reducing the coal briquette in an burning apparatus to manufacture reduced iron, for example, partially reduced iron. Here, the iron raw material is an object to be reduced and may use at least one of an iron ore, an iron-containing dust and sludge produced in a steel manufacturing process. Also, the carbonaceous material is a reductant reducing the iron raw material and may use at least one of coal and an iron-containing dust produced in a steel manufacturing process. Here, the partially reduced iron means that Fe contained in the iron raw material is not fully reduced up to 100%, but is partially reduced in a range of less than 100%. Of course, the reduced iron reduced up to 100% may be manufactured by adjusting a burning time and a heat-treatment temperature, but there is a problem in that the burning apparatus is overloaded in order to manufacture the 100% reduced iron As illustrated in FIG. 1, a reduced iron includes a plurality of hoppers 100 and 110 accommodating an iron raw material and a carbonaceous material, respectively, a crusher 200 receiving the iron material and the carbonaceous material from the hoppers 100 and 110, respectively to crush the iron material and the carbonaceous material, a mixer 300 receiving the crushed iron material and the carbonaceous material from the crusher 200 to mix the crushed iron material and carbonaceous material, a molding machine 400 compressing and molding a mixture mixed in the mixer 300, and a burning apparatus 500 heat-treating and burning a coal briquette manufactured in the molding machine 400, and cooling the coal briquette. Here, the iron raw material and the carbonaceous material as raw materials of the coal briquette are exemplarily provided, but a sub-raw material, such as a binder, for facilitating binding between the iron raw material and the carbonaceous material and improving the strength of the coal briquette may be additionally used, and accommodated in the hopper 120 illustrated in FIG. 1.

Although not illustrated in detail, the molding machine 400 is a molding machine provided with a pair of rolls facing each other, that is, a twin roll molding machine. Therefore, when the mixture is charged between the pair of rolls, the coal briquette is manufactured by extrusion due to rotation of the pair of rolls.

The burning apparatus 500 heat-treats and reduces the coal briquette manufactured in the molding machine 400 and then cools the coal briquette. For example, the burning apparatus 500 has an inner space and is provided with a heating means to heat-treat and reduce the coal briquette. The burning apparatus is partitioned into a plurality of regions, some of which may include a burning furnace communicated with each other. Therefore, at least part of an exhaust gas generated in a process of manufacturing reduced iron is circulated inside the burning furnace to control a temperature and an oxygen concentration inside the burning furnace, thereby improving a metallization rate of partially reduced iron.

Example 1

Figure 2:
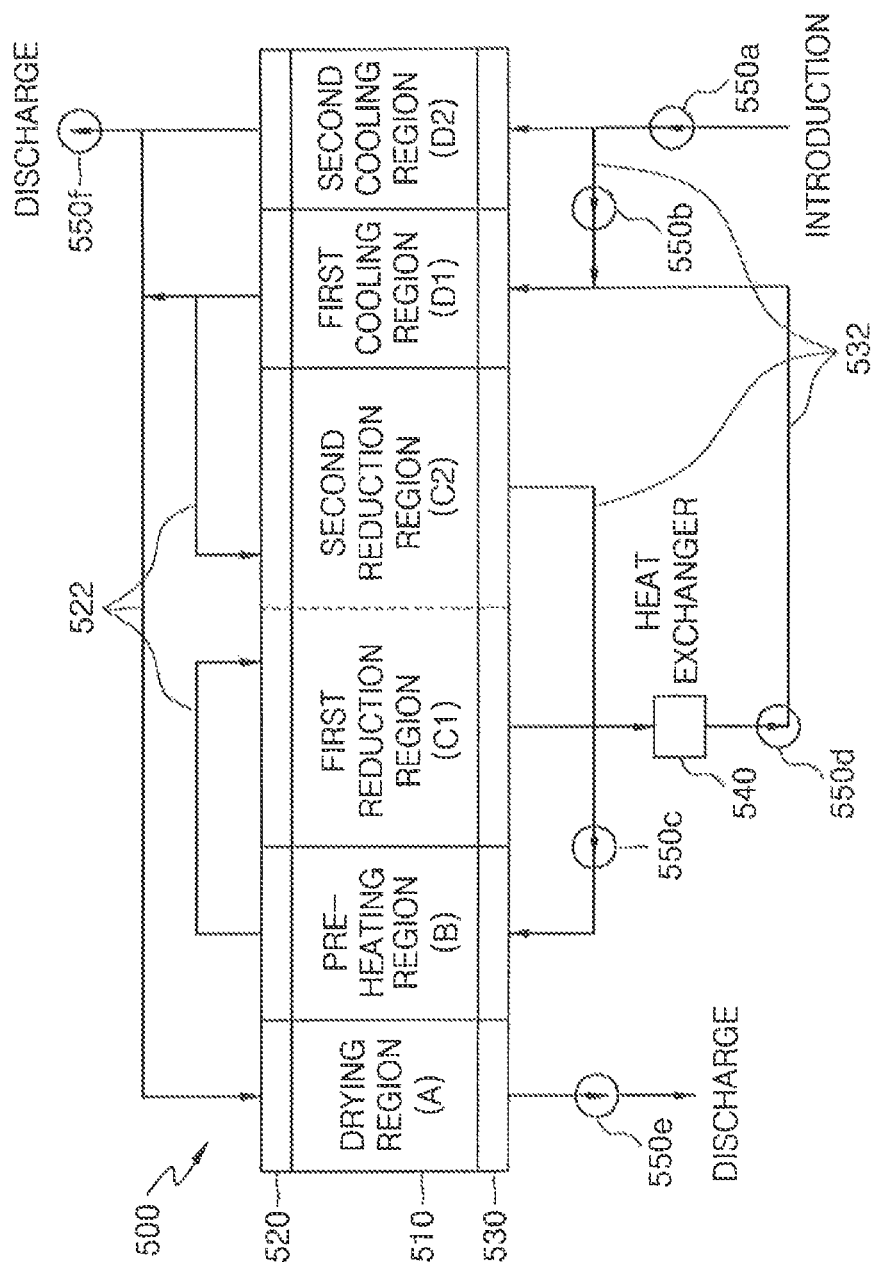
FIG. 2 is a block diagram showing an internal structure of a burning apparatus and a flow of a fluid in accordance with an exemplary embodiment.

FIG. 2 is a block diagram showing an internal structure of a burning apparatus and a flow of a fluid in accordance with an exemplary embodiment.

Referring to FIG. 2, a burning apparatus 500 includes a burning furnace 510 defining a path allowing a truck accommodating a coal briquette thereinside to move, an upper passage 520 disposed in an upper portion of the burning furnace 510 so as to be communicated with the burning furnace 510 and partitioned into a plurality of regions along a longitudinal direction of the burning furnace 510, an upper connection pipe 522 disposed in the upper passage 520 to communicate at least two different regions, a lower passage 530 disposed in a lower portion of the burning furnace 510 so as to be communicated with the burning furnace 510 and partitioned into a plurality of regions along a longitudinal direction of the burning furnace 510, and a lower connection pipe 532 on the lower passage 530 to communicate at least two different regions.

The burning furnace 510 has an inner space, and opened both sides, wherein the truck accommodating the coal briquette enters through one side and the truck exits through the other side. A heating device may be provided in an upper portion of the burning furnace 510 so as to heat the coal briquette accommodated on the truck to a predetermined temperature and thus to reduce the coal briquette. Here, the heating device may be a burner and uses LPG and air as a fuel for heating. Also, a heated gas generated by the burner heats an inside of the burning furnace 510, thus resulting in reduction between an iron raw material and a carbonaceous material of the coal briquette loaded on the truck entering the burning furnace 510. Of course, various means may be used in addition to the burner as means for heating the burning furnace 510, and various materials may be used as fuels in addition to the LPG and air.

The burning furnace 510 is formed into one space in its appearance, but the burning furnace 510 may be partitioned into a plurality of regions along a movement direction of the truck. That is, as illustrated in FIG. 2, the burning furnace 510 may be partitioned, from the side through which the truck enters, a drying region A, a pre-heating region B, reduction regions C1 and C2, and cooling regions D1 and D2 in order.

Moisture is contained inside the coal briquette manufactured in the molding machine 400. Thus, when the coal briquette is rapidly heated to a high temperature, the coal briquette may be broken while the moisture inside the coal briquette is evaporated. In order to prevent this, the coal briquette is heated to a predetermined temperature, for example, a temperature of approximately 200° C. to approximately 300° C. in the drying region A to remove the moisture contained inside the coal briquette. At this time, an exhaust gas exhausted from the cooling regions D1 and D2 is supplied to the drying region A, and the gas used in drying the coal briquette is discharged to the outside.

The truck which has passed through the drying region A is moved toward the pre-heating region B. The coal briquette is heated in the pre-heating region B to facilitate reduction of the coal briquette and to remove tar, volatile matters and the like contained inside the coal briquette. The tar, volatile matters and the like contained inside the coal briquette are volatilized at a temperature of approximately 300° C. to approximately 800° C. As a pre-heating gas, an exhaust gas generated in a process of reducing the coal briquette is supplied to the pre-heating region B. Meanwhile, the tar and the volatile matters inside coal are converted into CHn based gas during evaporation, which may be used as a fuel during burning, and thus an exhaust gas generated in the pre-heating process may be supplied to the reduction regions C1 and C2.

Afterwards, the truck which has passed through the pre-heating region B is moved toward the reduction regions C1 and C2. The reduction regions C1 and C2 are a region inside the burning furnace 510, where a reduction reaction of the coal briquette substantially occurs. At this time, temperatures of the reduction regions C1 and C2 may be controlled to approximately 100° C. to approximately 1200° C. at which reduction of the coal briquette occurs. Temperature control in the reduction regions C1 and C2 may be performed by using a heating device, such as the burner as described above. In addition, the exhaust gas introduced from the pre-heating region B may be used as a fuel for the heating device.

Specifically, the reduction regions C1 and C2 may be partitioned into two regions, that is, a first reduction region C1 which is adjacent to the pre-heating region B and in which the coal briquette is substantially heated, and a second reduction region C2 which is adjacent to the cooling region D1 and in which a reduction reaction of the coal briquette heated and then raised in temperature is continued. Here, an exhaust gas generated in the first reduction region C1 may be supplied to the cooling region D1, and an exhaust gas generated in the second reduction region C2 may be supplied to the pre-heating region B.

Thereafter, the truck which has passed though the reduction regions C1 and C2 is moved toward the cooling regions D1 and D2. In the cooling regions D1 and D2, the coal briquette reduced in the reduction regions C1 and C2, that is, reduced iron is cooled. The coal briquette in which the reduction is completed, generally has a high temperature of approximately 1200° C., and the coal briquette is cooled to a temperature of approximately 100° C. while passing through the cooling regions D1 and D2 to exit from the burning furnace 510. The cooling regions D1 and D2 may be partitioned into a first cooling region D1 adjacent to the reduction regions C1 and C2, and a second cooling region D2 adjacent to the outside, that is, the other side of the burning furnace 510 through which the truck exists. The reduced iron may be cooled stage by stage in the first cooling region D1 and the second cooling region D2. The reduced iron is cooled to a temperature of approximately 400° C. in the first cooling region D1, and is cooled to a temperature of approximately 100° C. in the second cooling region D2. At this time, since the first cooling region D1 has a temperature at which re-oxidation easily occurs by oxygen contained inside the burning furnace 510, an adjustment of an oxygen concentration is required in the first cooling region D1. That is, in order to suppress or prevent re-oxidation of the reduced iron, it is desirable that the oxygen concentration in the first cooling region D1 is minimized. Therefore, the exhaust gas generated in the first reduction region C1 and the second reduction region C2, more preferably, the exhaust gas generated in the first reduction region C1 may be supplied to the first cooling region D1 as a cooling gas. The reason is why the exhaust gas of the first reduction region C1 has a temperature lower than that of the exhaust gas of the second reduction region C2. The exhaust gas exhausted from the first reduction region C1 may be introduced into the first cooling region D1 in a state that a temperature thereof is reduced via a heat exchanger. Also, a gas used in cooling the reduced iron in the first cooling region D1 may be used as a heating gas necessary for drying the coal briquette. At this time, although the exhaust gas generated in the reduction regions C1 and C2 has a temperature higher than that of the gas generated in the cooling regions D1 and D2, the exhaust gas generated in the reduction regions C1 and C2 has a high temperature of approximately 1000° C. to approximately 1200° C., and thus the exhaust gas generated in the reduction regions C1 and C2 is undesirable to be used as a heating gas for drying the coal briquette. The gas generated in the first cooling region D1, for example, the gas having a temperature of approximately 500° C. may be supplied to the drying region A to be used in drying the coal briquette.

Also, air is directly introduced into the second cooling region D2 from the outside to cool the reduce iron. Since the second cooling region D2 is cooled to a temperature lower than a temperature at which re-oxidation of the reduced iron occurs, re-oxidation by oxygen lowered although air is introduced into the second cooling region D2 from the outside to cool the reduced iron. At this time, a part of air introduced into the second cooling region D2 may be introduced into the first cooling region D1, because the exhaust gas introduced from the first reduction region C1 has a very high temperature and thus the exhaust gas should be diluted with air introduced from the outside to drop the temperature of the exhaust gas. The exhaust gas exhausted from the first reduction region C1 is supplied to the first cooling region D1 in a state that a temperature thereof is reduced via the heat exchanger as described above. Also, a part of a gas generated by cooling the reduced iron in the second cooling region D2 is discharged to the outside, and the remainder is supplied to the drying region A together with a gas generated by cooling the reduced iron in the first cooling region D1 and thus may be used as a heating gas for drying the coal briquette The upper passage 520 and the lower passage 530 may be disposed so as to surround, in upper and lower portions of the burning furnace 510, each region of the burning furnace 510, that is, the drying region A, the pre-heating region B, the reduction regions C1 and C2 and the cooling regions D1 and D2. The upper passage 520 and the lower passage 530 may be provided as, for example, a plurality of hoods.

Also, as described above, the upper connection pipe 522 and the lower connection pipe 532 may be disposed to connect at least two different regions such that the exhaust gas and air are supplied to and discharged from each region of the burning furnace 510 to be circulated. For example, the upper connection pipe 522 may be connected to the upper passage 520 such that the gas exhausted from the first cooling region D1 and the second cooling region D2 is supplied to the drying region A, and the lower connection pipe 532 may be connected to the lower passage 530 such that the exhausted gas is supplied to the first cooling region D1 from the first reduction region C1. The upper connection pipe 522 and the lower connection pipe 532 may be provided with a plurality of suction devices 550a, 550b, 550c, 550d, 550e, and 550d introducing air, and generating a flow of a gas for supplying a gas generated in each region to other regions or discharging the gas generated in each region. Also, the lower connection pipe 532 may be provided with a heat exchanger 540 for controlling a temperature of the gas discharged from the first reduction region C1.

In an exemplary embodiment, a temperature and an oxygen concentration inside the burning furnace 510 may be partially controlled for improving reduction efficiency of a briquette in a plurality of stages necessary for inducing a reduction reaction between the coal briquette, for example, coal (a carbon component) and an iron ore inside the briquette, and for suppressing an iron oxide (FeO) and the like from being melted. The exhaust gas generated in the plurality of stages necessary for inducing the reduction reaction of the coal briquette may be circulated inside the burning furnace 510 to control the temperature and the oxygen concentration in the each stage. Especially, in order to suppress the re-oxidation of the reduced coal briquette, that is, the reduced iron, it is very important to control the temperature and the oxygen concentration in the cooling region.

The influence of the temperature and the oxygen concentration on a metallization rate of the reduced iron will be discussed prior to describing a method for manufacturing reduced iron in accordance with an exemplary embodiment.

Figure 3:
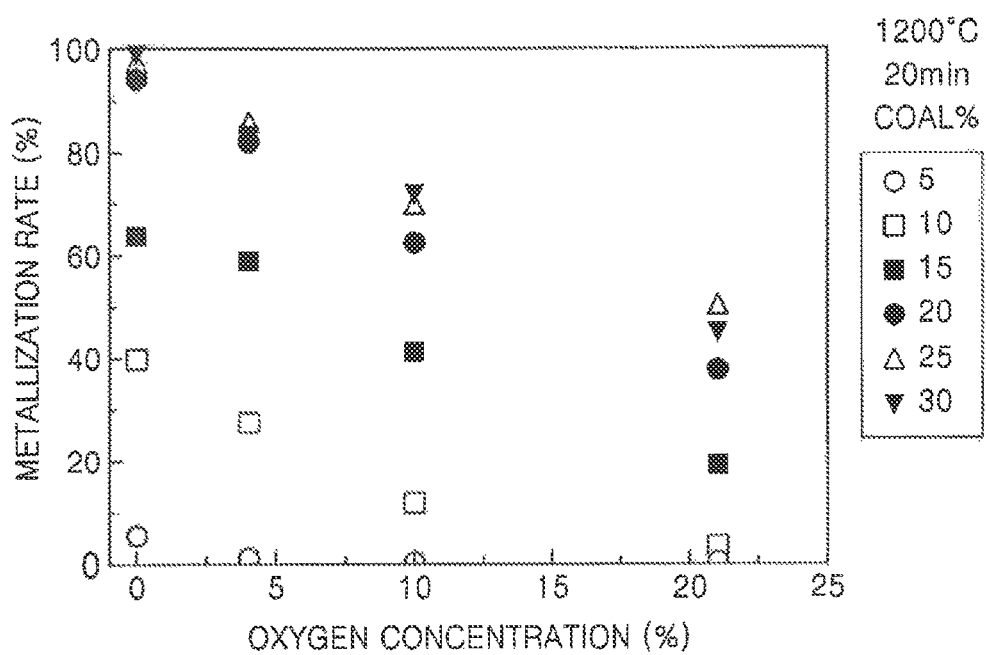
FIG. 3 is a graph showing a relation between an oxygen concentration and a metallization rate of reduced iron depending on a coal content.

FIG. 3 is a graph showing a relation between an oxygen concentration and a metallization rate of reduced iron depending on a coal content.

An ultrafine ore having a particle size of 0.1 mm or less was uniformly mixed with coal having a particle size of 1 mm or less to manufacture a carbonaceous material-containing briquette. The coal was added in an amount of 5 weight % to 30 weight % with respect to total weight of the ultrafine iron ore and the coal. While the carbonaceous material-containing briquette was maintained at a reduction temperature of 1200° C. for 20 minutes, a metallization rate of the briquette versus an oxygen concentration of a surrounding atmosphere was measured. Referring to FIG. 3, when coal contents inside the briquette are equal to each other, it may be seen that as the oxygen concentration of an atmospheric gas in a reduction is reduced, the metallization rate of the briquette is considerably increased. Therefore, it may be seen that when the oxygen concentration is maintained as low as possible in an open type burning furnace, it is effective in improving the metallization of the reduced iron.

Figure 4:
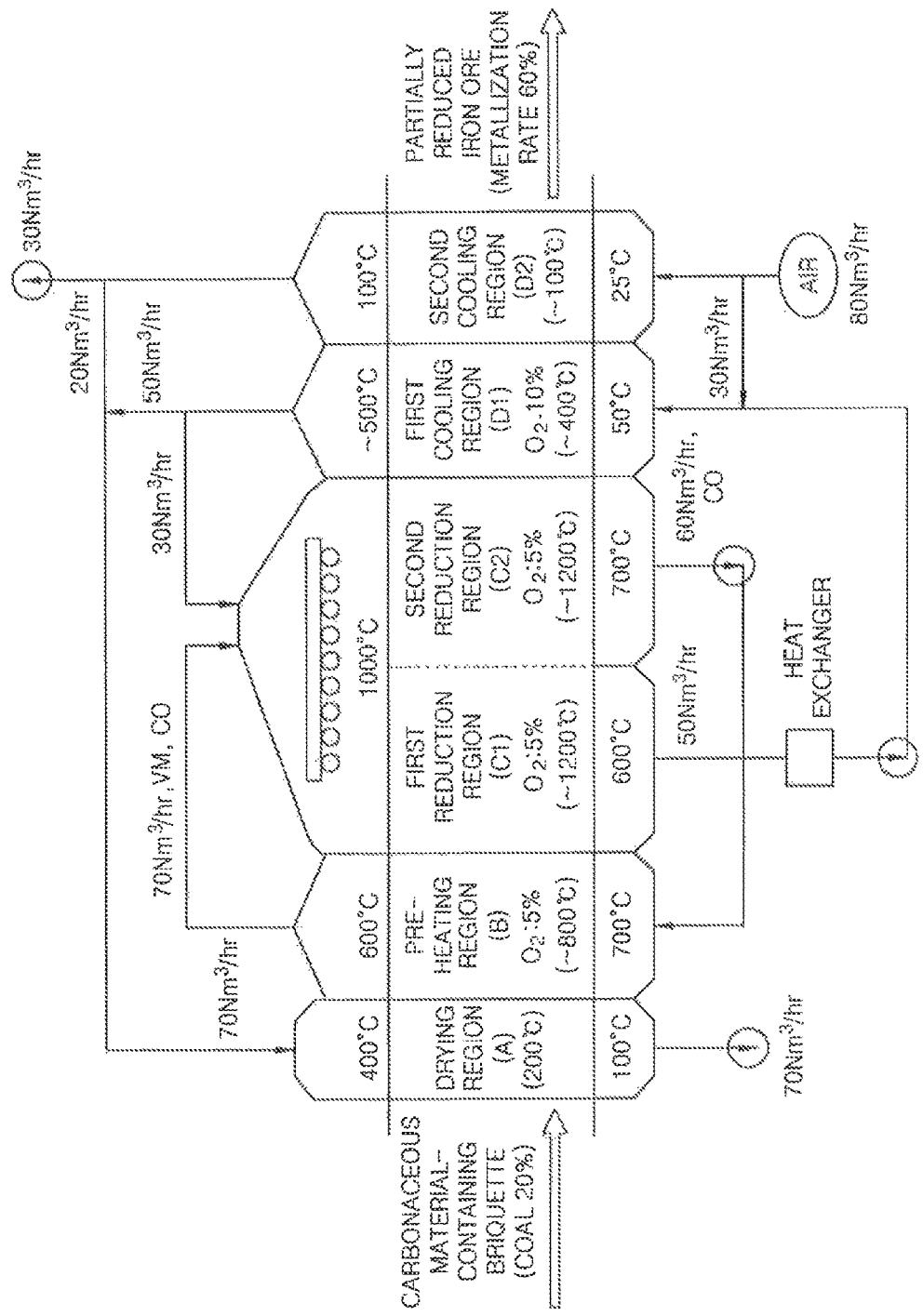
FIG. 4 is a view illustrating an oxygen concentration and a temperature distribution inside a burning apparatus in a process of manufacturing reduced iron through a method for manufacturing reduced iron in accordance with an exemplary embodiment.

FIG. 4 is a view illustrating an oxygen concentration and a temperature distribution inside a burning apparatus in a process of manufacturing reduced iron through a method for manufacturing reduced iron in accordance with an exemplary embodiment.

As illustrated in FIG. 4, while a coal briquette manufactured in the molding machine passes through the burning furnace 510, the coal briquette is reduced, cooled and then discharged to the outside via the drying region A, the pre-heating region B, and the reduction regions C1 and C2 and the first and second cooling regions D1 and D2. The coal briquette was manufactured from the carbonaceous material-containing briquette containing 20% of carbon, the metallization rate of the reduced iron manufactured through a reduction process as described below was measured 60%.

The coal briquette manufactured in the molding machine is accommodated on a movable truck and then introduced into the burning furnace 510. The truck is moved along an inside of the burning furnace 510, the coal briquette inside the truck experiences a drying process, a pre-heating process, a reduction process and a cooling process according to a temperature change inside the burning furnace 510, and then is discharged to the outside.

Meanwhile, a flow of a gas in the burning apparatus is started from introduction of air into the second cooling region D2.

The air is introduced into the lower passage 530 of the second cooling region D2 through the lower connection pipe 532 of the second cooling region D2. A part of the air introduced through the lower connection pipe 532 is introduced into the second cooling region D2, and the remainder air is introduced into the first cooling region D1 through the lower connection pipe 532. For example, when flux of the air introduced into the lower connection pipe 532 is 80N m$^3$/hr, 50N m$^3$/hr of the air may be introduced into the second cooling region D2, and 30N m$^3$/hr of the air may be introduced into the first cooling region D1.

The air introduced into the second cooling region D2 has a temperature of approximately 25° C., and cools the reduced iron cooled to a temperature of approximately 400° C. in the first cooling region D1, to a temperature of approximately 100° C., and a part of the air passes through the upper passage 520, and is discharged to the outside through the upper connection pipe 522, and the remainder is supplied to the drying region A through the upper connection pipe 522. At this time, the temperature of the gas which cools the reduced iron and is discharged to the outside through the upper connection pipe 522 via the upper passage 520 is increased to approximately 100° C., approximately 50N m$^3$/hr is discharged to the outside, and approximately 20N m$^3$/hr is supplied to the drying region A. Since the second cooling region D2 is cooled to a temperature lower than a temperature at which the reduced iron may be re-oxidized, there is no need to control the oxygen concentration inside the second cooling region D2.

Also, air supplied to the first cooling region D1 through the lower connection pipe 532 is supplied to the first cooling region D1 together with a gas discharged from the first reduction region C1, cools the reduced iron in the first cooling region D1, and is then discharged through the upper connection pipe 522 via the upper passage 520 to be supplied to drying region A and the second reduction region C2. The air and the gas supplied to the first cooling region D1 have a temperature of approximately 50° C., rapidly cool the reduced iron, and are then discharged at an increased temperature of approximately 500° C. The gas supplied from the first reduction region C1 is diluted with air supplied from the outside and controlled so as to have approximately 10% of an oxygen concentration, and the reduced iron is cooled to a temperature of approximately 400° C. In this way, when the oxygen concentration is controlled in the first cooling region D1, the re-oxidation of the reduced iron may be reduced. Approximately 50N m$^3$/hr of a gas and approximately 30N m$^3$/hr of air introduced from the outside in the first reduction region C1 are supplied to the first cooling region D1, and a gas discharged from the first reduction region C1 is cooled in a heat exchanger provided on the lower connection pipe 532 and thus is supplied to the first cooling region D1.

Thereafter, approximately 30N m$^3$/hr of the gas discharged from the first cooling region D1 is supplied to the second reduction region C2, and approximately 50N m$^3$/hr of the remainder is supplied to the drying region A.

The gas supplied to the second reduction region C2, is supplied to the pre-heating region B through the lower connection pipe 532 via the lower passage 530.

Also, after the coal briquette is pre-heated to a temperature of approximately 800° C. by using the gas having a temperature of approximately 700° C. supplied from the second reduction region C2 in the pre-heating region B, the coal briquette is supplied to the first reduction region C1 at a decreased temperature of approximately 600° C. through the upper passage 520. At this time, the pre-heating region B is supplied with a gas used in reducing the coal briquette and thus may be controlled to have approximately 5% of the oxygen concentration.

Also, approximately 70 N m$^3$/hr of a gas is supplied to the first reduction region C1 from the pre-heating region B, wherein a gas supplied to the pre-heating region B and volatile matters of coal and carbon monoxide generated in a coal briquette pre-heating process are contained in a gas, and thus the gas having flux more than that of the gas supplied to the pre-heating region B is discharged. A reduction gas is maintained to a temperature of 1000° C. by a burner provided on the upper passage 520, and concurrently tar and volatile mattered contained in the gas introduced from the pre-heating region B are burnt in the first reduction region C1. Also, carbon monoxide (CO) and carbon dioxide ($CO_2$) are generated while the coal briquette is reduced, and thus a gas to be discharged has a slightly higher content than that of the gas introduced into the second reduction region C2.

The first reduction region C1 is controlled so as to have approximately 5% of an oxygen concentration by using a gas supplied from the pre-heating region B and a gas passing discharged through the lower passage 530 via the first reduction region C1 is supplied to the first cooling region D1 as described earlier.

Meanwhile, a gas supplied from the first cooling region D1 and second cooling region D2 is supplied to the drying region to dry the coal briquette, and then discharged to the outside through lower connection pipe 532 via the lower passage 530. At this time, a gas introduced into the drying region has a content of approximately 50N m$^3$/hr of the exhaust gas supplied from the first cooling region D1 and approximately 20N m$^3$/hr of the exhaust gas supplied from the second cooling region D2, dries the coal briquette, and is then discharged to the outside through the lower connection pipe 532 via the lower passage 530 of the drying region A.

As described above, it may be confirmed that a temperature and an oxygen concentration may be partially controlled to improve a metallization rate of the reduced iron in the burning furnace 510 in which reduction of the coal briquette occurs. Also, an exhaust gas generated in a process reducing the coal briquette is circulated inside the burning furnace 510, and thus energy necessary for the process of reducing the coal briquette may be obtained, thereby suppressing or preventing superfluous energy consumption.

Example 2

Figure 5:
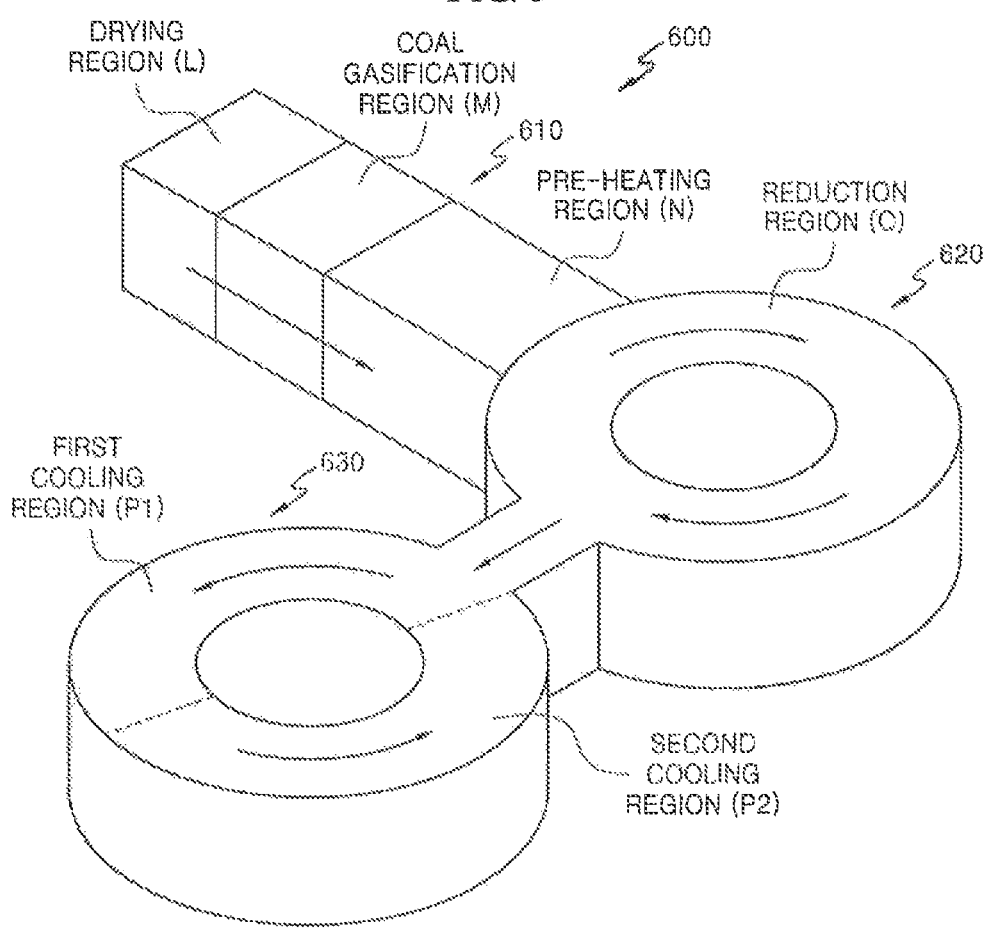
FIG. 5 is a schematic view illustrating a structure of a burning apparatus in accordance with another exemplary embodiment.
Figure 6:
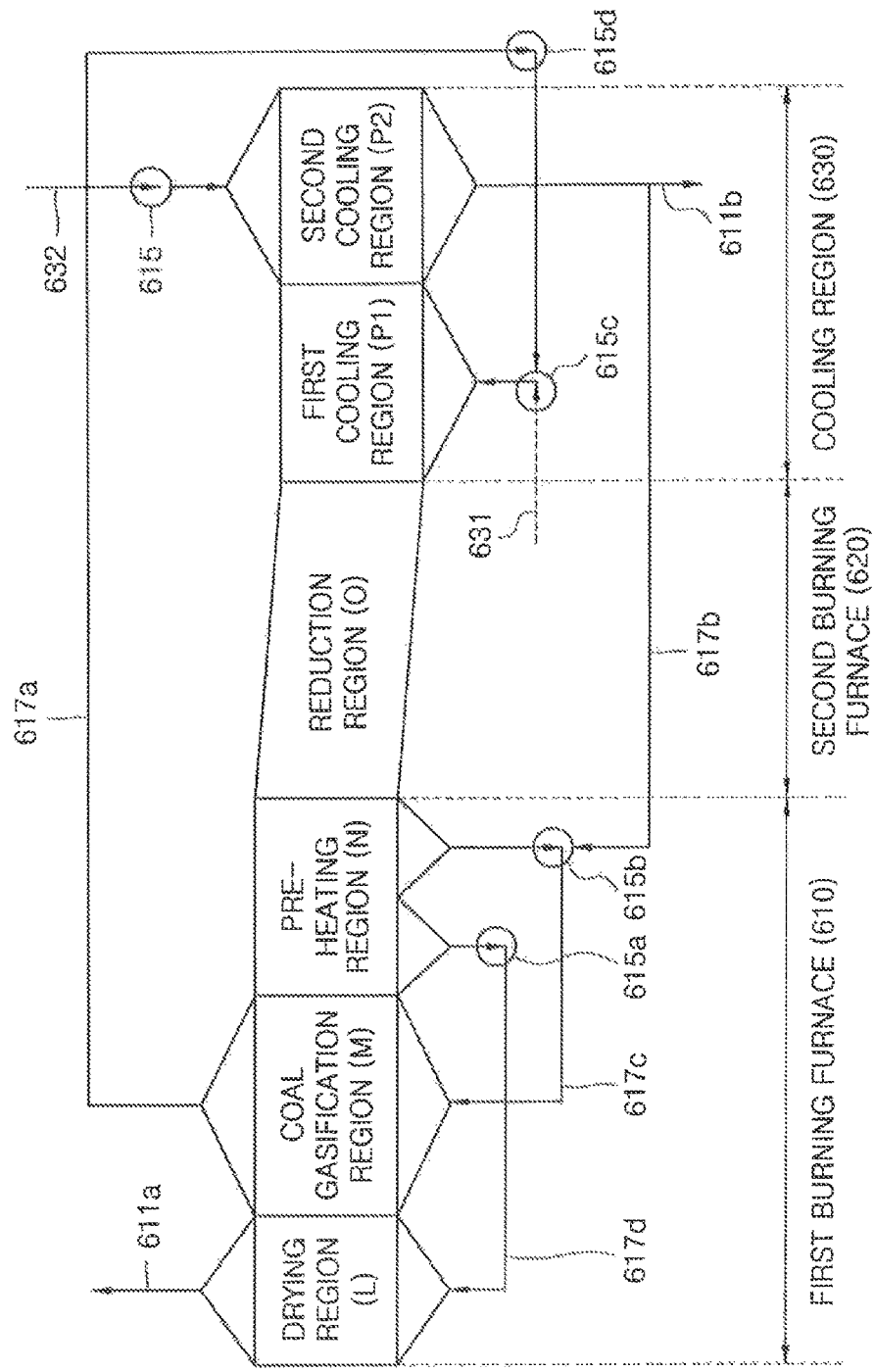
FIG. 6 is a block diagram showing an internal structure of a burning apparatus and a flow of a fluid according to a movement path of a coal briquette.

FIG. 5 is a schematic view illustrating a structure of a burning apparatus in accordance with an exemplary embodiment, and FIG. 6 is a block diagram showing an internal structure of a burning apparatus and a flow of a fluid according to a coal briquette movement.

Referring to FIGS. 5 and 6, a burning apparatus 600 includes a first burning furnace 510 defining a linear path along which a truck accommodating a coal briquette therein moves from one side to the other side to heat the coal briquette, a second burning furnace 520 defining an annular path which is connected to the other side of the first burning furnace 510 and along which the coal briquette discharged through the other side of the first burning furnace 510 is moved to reduce the coal briquette, and a cooling region 530 connected to the second burning furnace 520 defining an annular path which is connected to the second burning furnace 520 and along which reduced iron discharged from the second burning furnace 520 is moved to cool the reduced iron.

The first burning furnace 510 has an inner space, and one side thereof is opened such that the truck accommodating the coal briquette enters the burning furnace 510. Also, the other side of the first burning furnace 510 is connected to the second burning furnace 520. The truck is moved along a movement path having a caterpillar shape formed in the similar shape as a sintering device and continuously moves the coal briquette, and the first burning furnace 510 may be formed so as to surround an upper side movement path of the movement path having the caterpillar shape. The first burning furnace 510 is formed into one space in its appearance, but the burning furnace 510 may be partitioned into a plurality of regions along a movement direction of the truck. That is, as illustrated and shown in FIGS. 5 and 6, from one side through which the truck enters, the burning furnace 610 may be partitioned into a drying region L, a coal gasification region M, and a pre-heating region N in order. The inner space of the first burning furnace 610 may be defined by upper passages (not shown), and lower passages (not shown) which are provided in an upper and lower portions of the first burning furnace 610, respectively. The upper passages and the lower passages may be formed in a shape such as a duct. Also, the upper passages and the lower passages may be connected by a plurality of connection pipes 617a, 617b, 617c and 617d communicated with different regions, respectively. The connection pipes 617a, 617b, 617c and 617d are connected to the upper passages and the lower passages to thereby communicate different regions of the first burning furnace 610 to each other, or communicate any one region of the first burning furnace 610 and the first burning furnace 620 or the cooling region 630 to each other. For example, the connection pipes 617a, 617b, 617c and 617d may connect the coal gasification region M and a cooling region (a first cooling region P1 to be described later) to each other to supply an exhaust gas generated in the coal gasification region M to the cooling region, and may also connect the pre-heating region N and the drying region L to each other, and the pre-heating region N and the coal gasification region M to each other to supply an exhaust gas generated in the pre-heating region NN to the drying region L and the coal gasification region M, respectively. The connection pipes 617a, 617b, 617c and 617d may be provided with a plurality of suction devices 615a, 615b, 615c and 615d generating a flow of a gas for supplying a gas generated in each region to other regions or discharging the gas generated in each region. Also, the exhaust pipe 611a discharging an exhaust gas generated in drying the coal briquette may be connected to the drying region L of the first burning furnace 610

The second burning furnace 620 is disposed at the other side of the first burning furnace 610, that is, a portion on which a movement direction of the truck is changed, and the coal briquette discharged from the truck while the movement direction of the truck is changed, is charged into the second burning furnace 620. While the coal briquette charged into the second burning furnace 620 is moved along the annular path of the second burning furnace 620, the coal briquette is heated to be reduced.

The second burning furnace 620 may be a kiln furnace typically called a rotary furnace. In the second burning furnace 620, a body having an upper wall and a side wall to define an inner space, and a hearth having a bottom surface spaced apart from the upper wall and formed inside the body move along a rail. The body is formed in an annular shape, and the hearth is provided so as to rotate inside of the body having the annular shape. Also, a plurality of burners may be disposed on the side wall of the body to control an atmosphere and a temperature of the inner space of the body. The coal briquette discharged from the first burning furnace 610 is reduced in the second burning furnace 620 as configured above, and here, the second burning furnace 620 is referred to as a reduction region O. Here, the second burning furnace 620 may be also inclined toward the cooling region 630 downward such that an exhaust gas generated in the second burning furnace 620 is smoothly introduced into the pre-heating region N of the first burning furnace 610.

After the coal briquette is reduced inside the second burning furnace 620, the coal briquette is discharged into the cooling region 630 connected to the second burning furnace 620, then cooled, and is discharged to the outside. The cooling region 630 may be formed in the virtually same structure as the second burning furnace 620. Meanwhile, an inner space of the cooling region 630 is partitioned into two regions, and thus reduced iron manufactured in the second burning furnace 620 may be cooled in two stages. Also, the inner space of the cooling region 630 may be partitioned into a first cooling region P1 and a second cooling region P2 by a partition, ducts (Not shown) or the like disposed on the upper wall of the body upward and downward. At this time, a first instruction pipe 631 may be connected to a lower portion of the first cooling region P1, and the first flow pipe may be re-connected to the connection pipe 617*a* of the coal gasification region M to mix outside air and an exhaust gas discharged from the coal gasification region M and thus to supply the mixed outside air and exhaust gas to the first cooling region P1 as occasion demands. The first flow pipe 631 may be provided with a suction device 615*e* for sucking outside air. Also, a second flow pipe 632 into which outside air is introduced through an upper portion may be connected to the second cooling region P2, and a part of an exhaust gas generated by cooling the reduced iron may be discharged into the outside through an exhaust pipe 611*b* on a lower portion and the remainder may be supplied through the connection pipes 617*b* and 617*c* connected to the coal gasification region M.

The burning apparatus formed as described above will be described as follows.

A drying region L removes moisture contained in a coal briquette. That is, moisture is contained inside the coal briquette manufactured in the molding machine 400, and when the coal briquette is rapidly heated to high temperature that approaches reduction temperature, the coal briquette may be broken while the moisture inside the coal briquette is evaporated. In order to prevent this, the coal briquette is heated to a predetermined temperature, for example, a temperature of approximately 200° C. to approximately 300° C. in the drying region L to remove the moisture contained inside the coal briquette.

A coal gasification region M heats the coal briquette dried in the drying region L to remove tar, a volatile matter and the like contained in the coal briquette. At this time, the tar, the volatile matter and the like contained inside the coal briquette are volatilized at a temperature of approximately 300° C. to approximately 800° C. The tar and the volatile matter inside coal are removed to be converted into CHn series, and since the CHn series may be used as a fuel, an exhaust gas generated in the coal gasification process may be supplied to a first cooling region P1. Like this, when the exhaust gas generated in the coal gasification process is supplied to the first cooling region P1, the CHn series exhaust gas contact reduce iron having high temperature and thus the CHn is decomposed, thereby improving cooling effect of the reduced iron due to heat of decomposition of the CHn. Also, C and H gases generated by decomposing the exhaust gas, may be supplied to a reduction region O and thus be used as a fuel for reducing the coal briquette.

Also, when an oxygen concentration is high in the coal gasification region M, since the coal and the volatile matter in the coal briquette is burnt to rapidly raise a temperature of the briquette, and thus a process temperature control may be difficult, control over the oxygen concentration is necessary in the coal gasification process. Therefore, the oxygen concentration may be controlled by using an discharged gas generated in the pre-heating region N and the reduction region O. That is, the exhaust gas generated in the reduction region O is discharged into the pre-heating region N, and is mixed with the exhaust gas generated in the reduction region O to be supplied to the coal gasification region M. The discharged gas generated in the pre-heating region N and the reduction region O is generated in a process reducing an iron ore, the exhaust gas has a low oxygen concentration and is a high temperature gas allowing the coal briquette to be raised in temperature to a temperature of approximately 800° C. At this time, when a temperature of the exhaust gas generated in the pre-heating C and the reduction region O is excessively high, the exhaust gas may be mixed with a part of an exhaust gas in a second cooling region P2 and thus be supplied to the coal gasification region M.

The pre-heating region N and the reduction region O are a region where a reduction reaction of the coal briquette occurs. At this time, in order to obtain strength of the coal briquette, a temperature of the pre-heating region N and the reduction region O may be controlled to a temperature of approximately 1000° C. to approximately 1200° C. The pre-heating region N is a region where the coal briquette is raised in temperature to a temperature necessary for reducing the coal briquette and the reduction reaction of the coal briquette occurs. Also, the reduction region O is a region where the coal briquette is substantially heated and the reduction reaction of the coal briquette continuously occurs. Here, the exhaust gas generated in the reduction region O may be supplied to the pre-heating region N and thus to heat the coal briquette. In addition to, the reduction region O may be provided with a burner as described above to heat the coal briquette to target temperature. The reduction region O is formed in a closed type revolver, and thus control of an inside atmosphere, especially, an oxygen concentration is easy, thereby suppressing melt of FeO and the like generated while the coal briquette is reduced.

Reduced iron manufactured in the reduction region O is discharged into the first cooling region P1, is moved along an inside of the cooling region, and passes through the second cooling region P2 to be discharged to the outside. At this time, outside air and an discharged gas generated in the coal gasification region M may be mixed to be supplied to the first cooling region P1 to control an oxygen concentration inside the first cooling region P1. That is, since reduced iron has a temperature at which re-oxidation easily occurs, it is necessary to control the oxygen concentration inside the first cooling region P1 in a low level. Therefore, an discharged gas generated in the coal gasification region M having a relatively low oxygen concentration and temperature may be supplied to the first cooling region P1 to rapidly cool the reduced iron to approximately 400° C., thereby suppressing or preventing re-oxidation of the reduced iron.

While the reduced iron cooled in the first cooling region P1 is moved along the second cooling region P2, the reduced iron is cooled to a temperature of approximately 100° C. to be discharged from the cooling region 630. Outside air is directly introduced into the second cooling region P2 to cool the reduced iron. Since the second cooling region P2 is cooled to a temperature lower than a temperature at which re-oxidation of the reduced iron occurs, although air is introduced from the outside to cool the reduced iron, re-oxidation by oxygen may be suppressed or prevented. The supply of outside air to the second cooling region P2 may induce a start of gas circulation in the burning apparatus.

In an exemplary embodiment, a temperature and an oxygen concentration inside the burning furnace 610 may be partially controlled for improving reduction efficiency of a briquette in a plurality of stages necessary for inducing a reduction reaction of the coal briquette, for example, coal (a carbon component) and an iron ore inside the briquette, and for suppressing melt of iron oxide (FeO) and the like. At this time, an exhaust gas generated in the plurality of stages necessary for inducing the reduction reaction of the coal briquette may be circulated inside the burning furnace 610 to control the temperature and the oxygen concentration in the each stage. Especially, in order to suppress the re-oxidation of the reduced coal briquette, that is, the reduced iron, it is very important to control the temperature and the oxygen concentration in the cooling region.

As described above, a movable truck type burning furnace, that is, an open type burning furnace and a rotary type burning furnace are applied to a burning apparatus in which reduction of the coal briquette occurs, and thus a metallization rate of reduced iron may be improved by partially controlling a temperature and an oxygen concentration at which the coal briquette is reduced. Also, an exhaust gas generated in a process reducing the coal briquette is circulated inside the burning furnace 610, and thus energy necessary for a process reducing the coal briquette may be obtained, thereby suppressing or preventing superfluous energy consumption.

In accordance with exemplary embodiments, reduced iron is manufactured by heating and cooling a coal briquette while moving along an open type burning furnace, a rotatory burning furnace and a rotatory cooling device, thereby easily controlling an oxygen concentration inside a burning furnace to improve process efficiency and also improve strength and a reduction rate of the reduced iron. Also, a part of a gas generated in a process of manufacturing partially reduced iron is circulated inside the burning furnace to control a temperature and an oxygen concentration inside the burning furnace, thereby improving a metallization rate of the partially reduced iron. Furthermore, energy used in controlling a temperature inside the burning furnace is saved, thereby reducing production costs. Moreover, materials, such as carbon monoxide and the like generated from raw materials forming the partially reduced iron are burnt inside the burning furnace, thereby improving energy efficiency and also suppressing environmental pollution.

Although a burning apparatus and a method for manufacturing reduced iron using the same have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. A method for manufacturing iron by moving a truck accommodating a coal briquette into a burning furnace, wherein the burning furnace is partitioned into a drying region, a pre-heating region, a reduction region, a first cooling region, and a second cooling region along a movement direction of the truck, the method comprising:
introducing air into the first cooling region and the second cooling region;
generating an exhaust gas in the pre-heating region, the reduction region, the first cooling region, and the second cooling region; and
circulating at least part of the exhaust gas inside the burning furnace;
wherein:
the exhaust gas generated in the reduction region is supplied to the first cooling region;
at least part of the exhaust gas generated by the air passing through the second cooling region is discharged to outside; and
the remainder of the exhaust gas generated by the air passing through the second cooling region is supplied to the drying region.

2. The method of claim 1, further comprising:
reducing at least part of the exhaust gas generated in the reduction region in temperature; and
supplying the at least part of the exhaust gas with reduced temperature to the first cooling region.

3. The method of claim 1, further comprising:
supplying at least part of the exhaust gas generated in the first cooling region to the drying region; and
supplying the remainder of the exhaust gas generated in the first cooling region to the reduction region.

4. The method of claim 3, further comprising:
supplying at least part of the exhaust gas generated in the reduction to the pre-heating region.

5. The method of claim 4, wherein the reduction region and the pre-heating region have an oxygen concentration lower than that of the first cooling region.

6. The method of claim 5, wherein the first cooling region has an oxygen concentration lower than that of the second cooling region.

7. A method for manufacturing reduced iron by moving a truck accommodating a coal briquette into a burning furnace, the method comprising:
generating a first exhaust gas by removing volatile matters of a carbonaceous material contained in the coal briquette;
circulating at least part of the generated first exhaust gas inside the burning furnace, and introducing external air inside the burning furnace;
cooling the reduced iron with the generated first exhaust gas and the external air;
pre-heating the coal briquette after removing the volatile matters of the carbonaceous material; and
mixing a second exhaust gas generated from pre-heating the coal briquette and a third exhaust gas generated from cooling the reduced iron to heat the coal briquette.

8. The method of claim 7, further comprising:
removing moisture prior to removing the volatile matters of the carbonaceous material by using a fourth exhaust gas generated from pre-heating the coal as a heat source.

9. The method of claim 8, further comprising:
cooling the reduced iron to a temperature of 400° C. or lower with the generated first exhaust gas from removing the volatile matters of the carbonaceous material; and cooling, to a temperature of 100° C. or lower, the reduced iron with the external air.

10. The method of claim 9, further comprising:
cooling, to a temperature of 100° C. or lower, the reduced iron with a gas mixture of the external air and the generated first exhaust gas from removing the volatile matters of the carbonaceous material.

* * * * *